United States Patent
Kitayama

(10) Patent No.: US 6,661,986 B2
(45) Date of Patent: Dec. 9, 2003

(54) IMAGE FORMING APPARATUS AND DRIVING APPARATUS FOR IMAGE FORMING MEANS USED IN THE IMAGE FORMING APPARATUS

(75) Inventor: Kunihiko Kitayama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/265,773

(22) Filed: Oct. 8, 2002

(65) Prior Publication Data
US 2003/0068177 A1 Apr. 10, 2003

(30) Foreign Application Priority Data

Oct. 10, 2001 (JP) ........................ 2001-312226
Dec. 27, 2001 (JP) ........................ 2001-396706

(51) Int. Cl.[7] .............................................. G03G 15/00
(52) U.S. Cl. .......................................... 399/167; 74/440
(58) Field of Search ......................... 399/88, 159, 167; 74/409, 440

(56) References Cited

U.S. PATENT DOCUMENTS

| | | | | |
|---|---|---|---|---|
| 1,629,564 A | * | 5/1927 | White ......................... | 74/440 |
| 2,311,902 A | * | 2/1943 | Roethel ........................ | 74/440 |
| 3,356,819 A | * | 12/1967 | Veillette et al. ............. | 200/330 |
| 3,545,296 A | * | 12/1970 | Eggins ......................... | 74/409 |
| 4,747,321 A | * | 5/1988 | Hannel ......................... | 74/440 |
| 6,438,341 B1 | * | 8/2002 | Matsuoka .................... | 399/117 |

FOREIGN PATENT DOCUMENTS

| | | | | |
|---|---|---|---|---|
| JP | 02057757 A | * | 2/1990 | .......... G03G/15/00 |
| JP | 04085224 A | * | 3/1992 | .......... G03G/15/00 |
| JP | 08069239 A | * | 3/1996 | .......... G03G/21/18 |
| JP | 09197905 A | * | 7/1997 | .......... G03G/15/00 |

* cited by examiner

Primary Examiner—Arthur T. Grimley
Assistant Examiner—Ryan Gleitz
(74) Attorney, Agent, or Firm—Fitzpatrick, Cella, Harper & Scinto

(57) ABSTRACT

An image forming apparatus having an image forming portion for forming an image, a drive source for generating a driving force for driving the image forming portion, a drive gear for transmitting the driving force from the drive source, a drive shaft for transmitting the driving force to the image forming portion, a first gear and a second gear fitted to the drive shaft and meshing with the drive gear, and a biasing member engaged with the first gear and the second gear and capable of circumferentially biasing the two, wherein in a state in which the first gear and the second gear mesh with the drive gear, it is possible to change over the biasing member to a biasing state and a bias releasing state.

26 Claims, 8 Drawing Sheets

IMAGE FORMING APPARATUS AND DRIVING APPARATUS FOR IMAGE FORMING MEANS USED IN THE IMAGE FORMING APPARATUS

BACKGROUND OF THE INVENTION

1. Field of the Invention

The invention relates to an image forming apparatus of the electrophotographic type such as a copying machine or a laser beam printer, or an image forming apparatus of the electrostatic recording type, and a driving apparatus for driving image forming means used in the image forming apparatus.

2. Related Background Art

As one of color image forming apparatuses, there is known a color laser beam printer of the tandem type, in which a plurality of photosensitive drums are juxtaposed, for effecting the formation of an image by superimposing toners of four colors, i.e., yellow, magenta, cyan and black, one upon another. Driving the photosensitive drums which are image bearing members highly accurately is an important matter to obtain an image of good quality suffering little from banding (an uneven tone of an image) and color misregister.

FIG. 8 of the accompanying drawings shows an example of a conventional driving construction for a photosensitive drum. The reference numerals 21 and 22 designate the front side plate and rear side plate (front and rear frame metal plates), respectively, of the main body of an image forming apparatus. A drum shaft 71 is rotatably bearing-supported between the front and rear side plates 21 and 22 through bearings 23 and 24. The photosensitive drum 11 is fixedly supported on the drum shaft 71.

The frame 32 of a drum driving unit is mounted on and fixed to the outside of the rear side plate 22. The rear end portion of the drum shaft 71 is rearwardly extended and is bearing-supported on the frame 32 through a bearing 33 and extends through the frame 32 to thereby protrude outwardly of the frame.

The reference numeral 34 denotes a motor mounted on and fixed to the inner side of the frame 32, and the reference numeral 35 designates a motor gear secured to the rotary shaft of this motor 34. A drum shaft gear 51 integrally disposed on the rear end portion of the drum shaft 71 is in meshing engagement with the motor gear 35. The motor gear 35 is a small-diametered gear and the drum shaft gear 51 is a large-diametered gear, and these gears together constitute a reduction gear train. The drum shaft gear 51 is fixed to the drum shaft 71 by the use of a spring pin 52, a compression spring 53 and a locating snap ring 54. The spring pin 52 is a circumferential coupling member for the drum shaft gear 51 and the drum shaft 71, and effects the transmission of drive. The compression spring 53 which is a biasing member and the locating snap ring 54 effect the axial positioning of the drum shaft gear 51 relative to the drum shaft 71. This construction is a construction in which the rotatively driving force of the motor 34 is transmitted to the drum shaft 71 through the motor gear 35 and the drum shaft gear 51 which are the reduction gear train to thereby rotatively drive the drum shaft 71, i.e., the photosensitive drum 11.

The uneven rotation of the photosensitive drums may be mentioned as one of the causes of the occurrence of banding and color mitsregister. The uneven rotation of the photosensitive drums is caused by the speed fluctuation of the meshing frequency of the gear train of the drum driving system and besides, may be caused by the transmission of the speed fluctuation of image forming process means acting on the photosensitive drums, particularly the speed fluctuation of recording material transporting means for transferring toner images to a recording material and transporting it or the speed fluctuation of an intermediate transfer member.

As an ordinary method of preventing banding, there is known a method of providing a flywheel 61 on the drum shaft 71, as shown in FIG. 8. This intends to contrive the suppression of the speed fluctuation of the photosensitive drums in an area of a relatively high frequency zone by an inertial effect. The flywheel 61 is fixed to the drum shaft 71 by the use of a screw 62.

On the other hand, as a method of preventing color misregister in an apparatus having a plurality of photosensitive drums, there are known the following two ways of view:

(1) The speed fluctuation of one revolution period of the photosensitive drum is made small to thereby reduce the expansion and contraction of an image of each color, and as a result, color misregister is suppressed.

(2) The amplitudes and phases of the expansion and contraction of images of respective colors caused by the speed fluctuation of one revolution period of the photosensitive drum are tuned to thereby cancel color misregister.

When an attempt is made to achieve an improvement in the accuracy of rotation of the photosensitive drum 11 along the way of view mentioned under item (1) above by the driving construction of FIG. 8, it is most important to make the vibration of the drum shaft gear 51 which is a driven gear provided on the drum shaft 71 small.

This will now be described. When the meshing position of two gears fluctuates in the radial direction thereof, the fluctuation of the rotating speed of the driven side occurs in proportion to the amount thereof. This is because the radial fluctuation of one revolution period, i.e., the vibration, of the driven gear is directly geometrically converted into the speed fluctuation of the one revolution period.

Here, the vibration of the above-described gear refers not to the vibration of the gear singly, but to the vibration in a state in which it is coupled to the drum shaft. To make the vibration of the gear in its coupled state small, it is necessary to make the vibration of the gear singly (a whole pitch meshing error) small and also, to couple the gear to the drum shaft so that there may be no eccentricity or inclination.

In the aforedescribed example of the conventional art, however, there are the following problems. Description will first be made of the problem of the flywheel provided with a view to prevent banding. In an apparatus of the tandem type, the radius of the flywheel is restricted by the interval between adjacent drums. Therefore, in order to secure a necessary amount of inertia, such design as increasing the thickness of the flywheel or axially offsetting and disposing the flywheel is usually made, but this results in the bulkiness of the apparatus.

Also, strength and rigidity are required of a drum shaft, a bearing, a frame, etc. for supporting the flywheel, and this results in a disadvantage in costs. Also, the addition of the flywheel leads to a corresponding increase in the necessary starting torque of a motor and therefore, a larger motor becomes necessary, and this means disadvantages in space and costs.

Further, in the case of a specification wherein the process speed of image formation is slowed down in conformity with the kind of the transfer material such as thick paper or OHT, there is the disadvantage that the inertial effect of the flywheel is greatly decreased. This is due to the fact that the inertial effect is proportional to the square of the speed, and when for example, the process speed is a half speed, the inertial effect becomes ¼, and when the process speed is a quarter speed, the inertial effect becomes ¹⁄₁₆. As a result, the flywheel is effective at ¹⁄₁ speed (standard speed), but in a low speed mode, there is a case where the effect of the prevention of banding is not obtained. If the amount of inertial is determined in accordance with a low speed, the above-described various disadvantages will greatly increase.

Also, a scissors gear often used in the driving system of an automobile can effect smooth driving because a main gear and a sub-gear are mutually rotatably biased and backlash is eliminated, and can be expected to be effective to prevent banding, but is difficult to assemble and is not popular in business machines including image forming apparatuses.

Description will now be made of a problem peculiar to a method of coupling the drum shaft and the gear together in the aforedescribed example of the conventional art regarding color misregister.

The necessity of coupling the gear to the drum shaft so that there may be no eccentricity is apparent from the foregoing description that the fluctuation of the rotating speed occurs from the radial fluctuation of the meshing position, and description will now be made of the reason for the necessity of the gear being fixed to the drum shaft so that there may be no inclination.

A helical gear is usually used as the gear of a drum driving system. This is because the helical gear is higher in contact ratio than a spur gear and is small in the speed fluctuation of a meshing frequency and is very effective for the prevention of banding. However, the helical gear has a helix angle and therefore has the demerit that when the meshing position of the gear axially fluctuates, it leads to a rotation error. Therefore, it becomes necessary to fix the gear to the drum shaft so that there may be no inclination.

It is necessary that the coupling of the gear and the drum shaft be done so that there may be no lash in the circumferential direction. This is because the presence of lash in the circumferential direction would cause a speed fluctuation if the load fluctuation of the photosensitive drum occurs under the influence of disturbance such as sheet feeding, and would result in color misregister or shock images.

The example of the conventional art shown in FIG. 8 is a construction in which the transmission of drive is effected with a spring pin 52 interposed between the drum shaft 71 and the drum shaft gear 51. The spring pin 52 is forced into a hole formed in the drum shaft 71 and on the other hand, is lightly forced into a groove portion formed in the drum shaft gear 51 and as a result, the drum shaft gear 51 and the drum shaft 71 are fixed to each other without any lash in the circumferential direction. Also, the dimensional relationship between the inner diameter of the drum shaft gear 51 and the outer diameter of the drum shaft 71 is made such that the gap therebetween is small to the utmost so as to decrease the eccentricity during the coupling thereof.

In the above-described construction, however, misalignment in centering occurs without fail between the drum shaft 71 and the spring pin 52 and between the spring pin 52 and the drum shaft gear 51 and as a result, the drum shaft gear 51 is fixed to the drum shaft 71 in its eccentric state. This occurs in a construction wherein the spring pin 52 extends through the drum shaft 71 and is engaged with the drum shaft gear 51 at two locations in the circumferential direction, as well as in a construction wherein the spring pin 52 does not extend through the drum shaft 71 to thereby form a one-arm construction and is engaged with the drum shaft gear 51 at one location in the circumferential direction, although there is a difference in degree.

Further, the amount of eccentricity of the drum shaft gear 51 relative to the above-described drum shaft 71 is not constant in the width wise direction (axial direction) of the gear and thus, causes also the inclination of the drum shaft gear 51 relative to the drum shaft 71. Accordingly, the above-described construction, even when the accuracy of the gear singly is good, results in the uneven rotation of the photosensitive drum 11 attributable to the coupling method for the drum shaft gear 51 to the drum shaft 71, and as a result, leads to color misregister.

Besides the above-described construction, as the coupling method for the gear, there is known a method of fastening a set screw or the like in a direction orthogonal to the axis of the gear to thereby couple the gear to the drum shaft, but in this method, the inclination of the gear becomes greater than in the aforedescribed fixing method using the spring pin, and this method is most undesirable.

SUMMARY OF THE INVENTION

The present invention has been made in view of the above-noted problems and the object thereof is to provide an image forming apparatus which contrives the prevention of banding during image formation and which is also excellent in assembling property, and a driving apparatus for image forming means used in the image forming apparatus.

A driving apparatus for image forming means used in an image forming apparatus for achieving the above object comprises:

a drive source for generating a driving force;

a drive gear for transmitting the driving force from the drive source;

a drive shaft for transmitting the driving force to the image forming means;

a first gear and a second gear fitted to the drive shaft and meshing with the drive gear;

biasing means engaged with the first gear and the second gear and capable of circumferentially biasing the two; and changeover means capable of changing over the biasing means between into a biasing state and into a bias-releasing state in a state in which the first gear and the second gear are in meshing engagement with the drive gear.

Also, an image forming apparatus for achieving the above object comprises:

image forming means for forming an image;

a drive source for generating a driving force for driving the image forming means;

a drive gear for transmitting the driving force from the drive source;

a drive shaft for transmitting the driving force to the image forming means;

a first gear and a second gear fitted to the drive shaft and meshing with the drive gear;

biasing means engaged with the first gear and the second gear and capable of circumferentially biasing the two; and changeover means capable of changing over the biasing means between into a biasing state and into a bias-releasing state in a state in which the first gear and the second gear are in meshing engagement with the drive gear.

DESCRIPTION OF THE PREFERRED EMBODIMENTS

Figure 6:
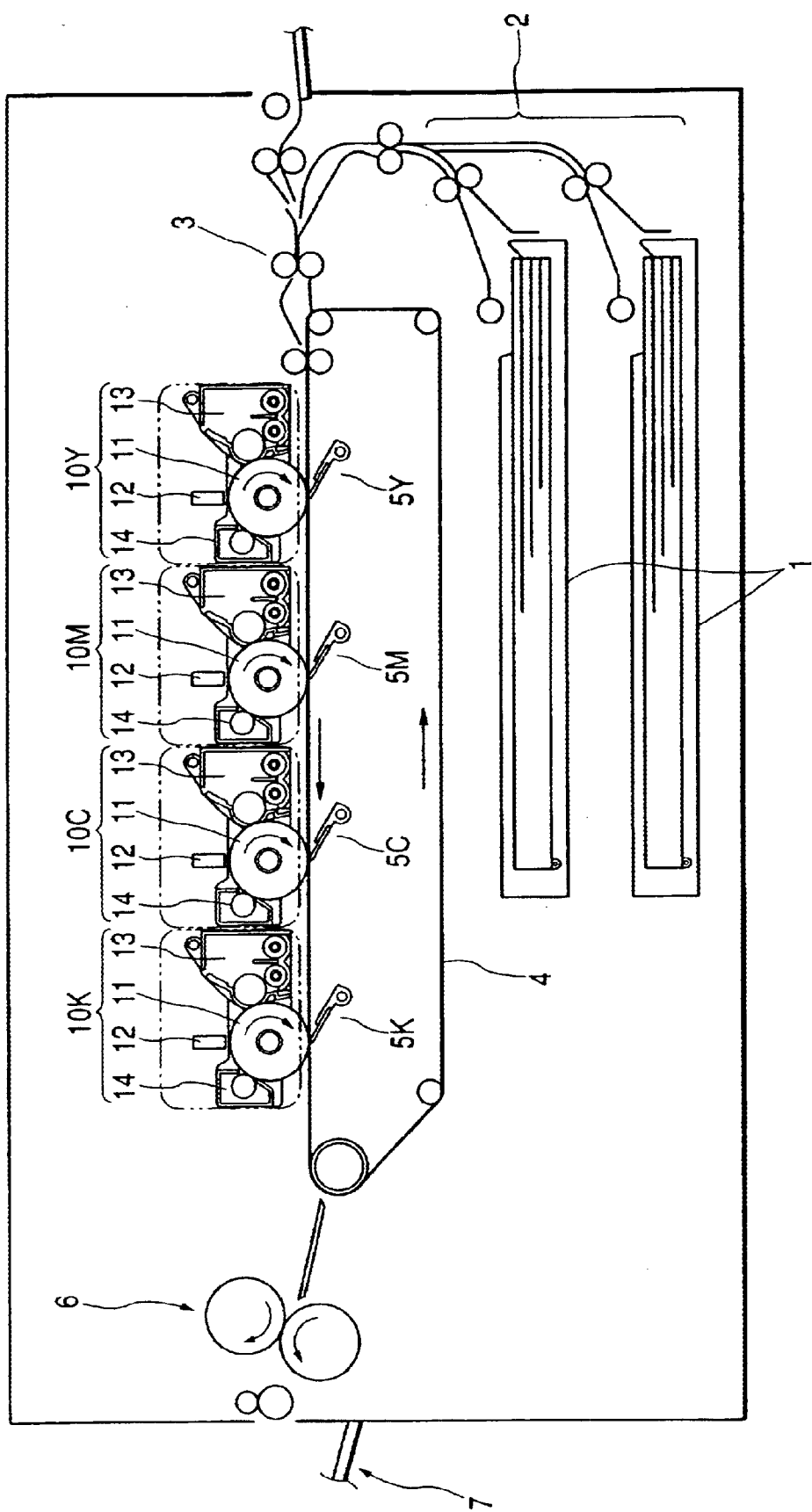
FIG. 6 is a schematic cross-sectional view of a color image forming apparatus.

Some embodiments of the present invention will hereinafter be described with reference to the drawings. FIG. 6 is a schematic cross-sectional view of a color image forming apparatus (color laser beam printer) to which the present invention is applicable. This apparatus is a tandem type apparatus which effects the formation of a color image by superimposing toners of four colors, i.e., yellow, magenta, cyan and black, one upon another. The apparatus is provided with a plurality of drum-shaped photosensitive members as image bearing members bearing toner images of the respective colors thereon.

The reference characters 10Y, 10M, 10C and 10K denote four color image forming portions of four colors, i.e., yellow, magenta, cyan and black, juxtaposed in the order from the right to the left. Each of the color image forming portions is an electrophotographic process mechanism using a photosensitive drum 11 as an image bearing member, and around the photosensitive drum 11 rotatively driven in the clockwise direction indicated by the arrow, there are disposed an exposing LED head 12 as exposing means, a developing device 13 and a charge-injection device 14 as charging means, and the photosensitive drum 11 is uniformly charged by the charging means 14, whereafter a latent image is formed by the exposing means 12, and the latent image is developed by the developing device 13. By these series of electrophotographic processes, a toner image of each color is formed on the surface of the photosensitive drum 11 in each color image forming portion.

That is, in the image forming portion 10Y, a yellow-toner image is formed on the surface of the photosensitive drum 11; in the image forming portion 10M, a magenta toner image is formed on the surface of the photosensitive drum 11; in the image forming portion 10C, a cyan toner image is formed on the surface of the photosensitive drum 11; and in the image forming portion 10K, a black toner image is formed on the surface of the photosensitive drum 11.

An endless transfer belt 4 as recording material transporting means is looped below the above-described four image forming portions 10Y, 10M, 10C and 10K and among these image forming portions, and is rotatively driven in a counter-clockwise direction as indicated by the arrow in FIG. 6. The reference numeral 1 denotes a cassette containing recording materials (recording paper) therein. The recording materials contained in the cassette 1 are fed one by one by a feeding portion 2, and thereafter arrive at registration rollers 3. The recording material has it skew feed or the like corrected by the registration rollers 3 and is fed toward the transfer belt 4 in timed relationship with image formation.

In the meantime, by an image information signal sent from an original reading apparatus (not shown) or an output apparatus (not shown) such as a computer, a latent image corresponding to each color is formed on the photosensitive drum 11 in each color image forming portion, and the latent image is developed as a toner image of each color.

The recording material fed out from the registration rollers 3 is electrostatically attracted onto the transfer belt 4, and is transported by the rotative movement of the transfer belt 4 while passing under the color image forming portions 10Y, 10M, 10C and 10K.

In the color image forming portions 10Y, 10M, 10C and 10K, the toner images of respective colors on the photosensitive drums 11 are successively superimposed and transferred onto the recording material by the action of transferring means 5Y, 5M, 5C and 5K at places where the transfer belt 4 and the photosensitive drums 11 are proximate to each other. The recording material onto which the toner images of the four colors have been transferred is stripped off from the transfer belt 4 by self-stripping and is transported to a fixing portion 6. The fixing portion 6 is heated, and the toners of the respective colors are heat-fused and the color images are fixed on the recording material. The recording material having a completed color image formed thereon is delivered onto a delivery tray 7, and the image forming operation is thus terminated.

Figure 7:
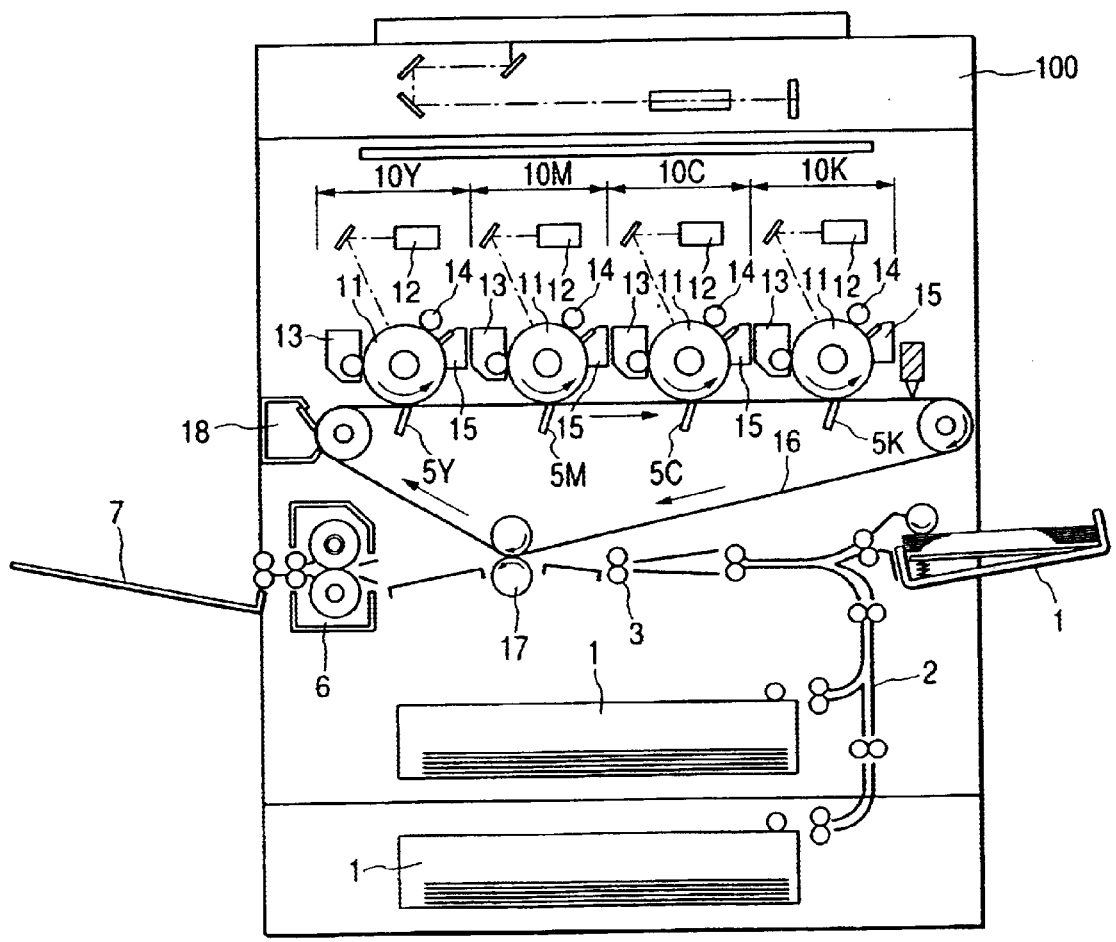
FIG. 7 is a schematic cross-sectional view of another color image forming apparatus.
Figure 8:
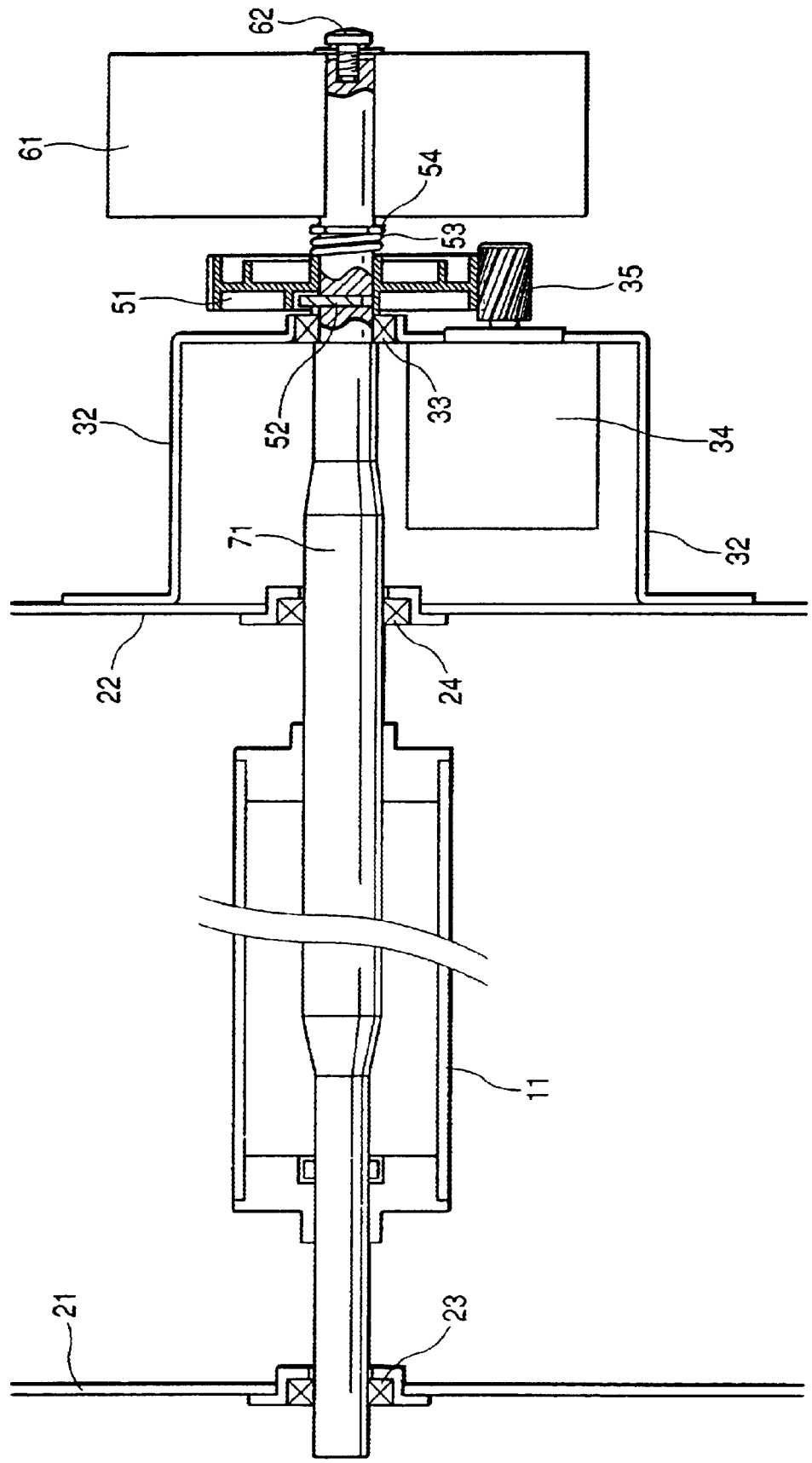
FIG. 8 shows an example of a conventional driving construction for a photosensitive drum.

In the case of a black single color mode, only the black image forming portion 10K performs the image forming operation. FIG. 7 is a schematic view of another color image forming apparatus. This color image forming apparatus, like the apparatus of FIG. 6, is of the tandem type, but the endless transfer belt 4 as the transferring portion recording material transporting means is made into an intermediate transfer belt 16 as an intermediate transfer member. The intermediate transfer belt 16 is rotatively driven in a clockwise direction as indicated by the arrow in FIG. 7, and yellow, magenta, cyan and black toner images are successively superimposed and transferred onto the surface of this intermediate transfer belt 16 by the transferring portions of the color image forming portions 10Y, 10M, 10C and 10K, whereby unfixed color toner images are compositely formed.

The color toner images compositely formed on this intermediate transfer belt 16 are collectively transferred to a recording material by a secondary transfer roller 17, and the recording material is transported to the fixing portion 6.

The reference numeral 100 designates an original reading apparatus. In the present embodiment, in the color image forming portions 10Y, 10M, 10C and 10K, the exposing means 12 are laser beam scanners, and the reference numeral 15 denotes photosensitive drum cleaners. The reference numeral 18 designates an intermediate transfer belt cleaner. In the case of the black single color mode, only the black image forming portion 10K performs the image forming operation.

Description will now be made of the driving construction for the photosensitive drums 11 in the color image forming portions 10Y, 10M, 10C and 10K in the color image forming apparatus of the present embodiment.

Figure 1:
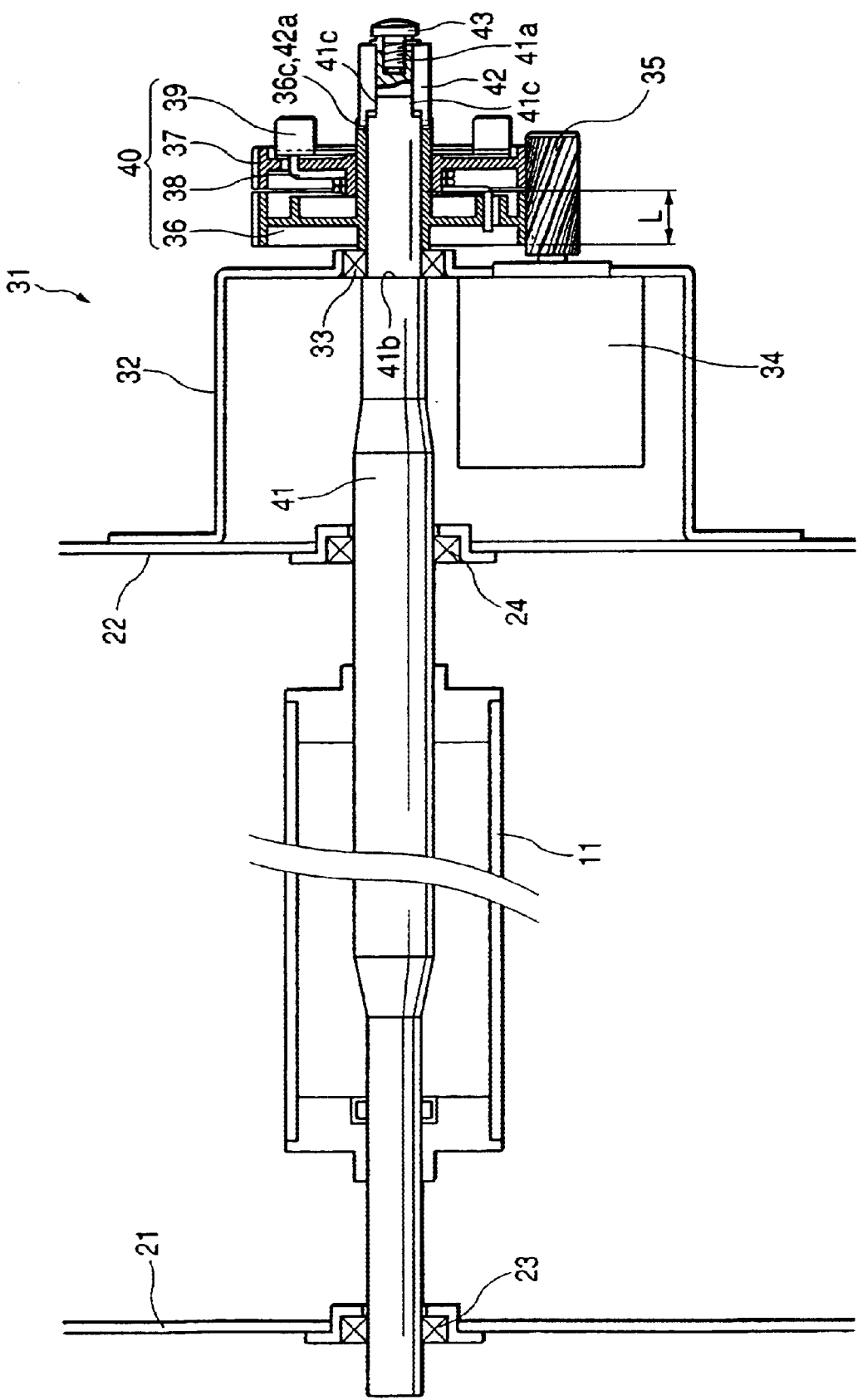
FIG. 1 shows a driving construction for a photosensitive drum in an embodiment of the present invention.

FIG. 1 shows the driving construction for the photosensitive drums which are image bearing members in the present embodiment. A drum driving unit 31 has a motor 34 as a drive source, a gear train as a speed reduction mechanism, and a drum shaft 41 as an output shaft. The main body of the drum driving unit is mounted on and fixed to a main body rear side plate 22, and the drum shaft 41 is positioned and supported between main body front and rear side plates 21 and 22 through bearings 23 and 24.

The photosensitive drum 11 is supported on the drum shaft 41, which is a rotary shaft, and is rotated integrally with the drum shaft 41. The two are firmly coupled together without any lash in the circumferential direction and the axial direction thereof.

The gear train as the speed reduction mechanism comprises a motor gear 35 and a drum shaft gear. The drum shaft gear is a so-called scissors gear and has a main gear (first gear) 36 formed of a resin material, a sub-gear (second gear) 37 formed of a resin material, and a biasing spring 38 as biasing means for biasing them. The biasing spring 38 is extended between the main gear 36 and the sub-gear 37 and generates a moment, and the motor gear 35, which is an opposed gear, is sandwiched between the main gear 36 and the sub-gear 37, and there is obtained the effect of eliminating any backlash between the drum shaft gear and the opposed gear. The main gear 36 is a drive transmitting gear, and the main gear 36 and the drum shaft 41 are fixed to each other without any lash in the circumferential direction and the axial direction thereof and are rotated integrally with each other. On the other hand, the sub-gear 37 is circumferentially rotatable relative to the main gear 36 and has the function of eliminating backlash.

Figure 2:
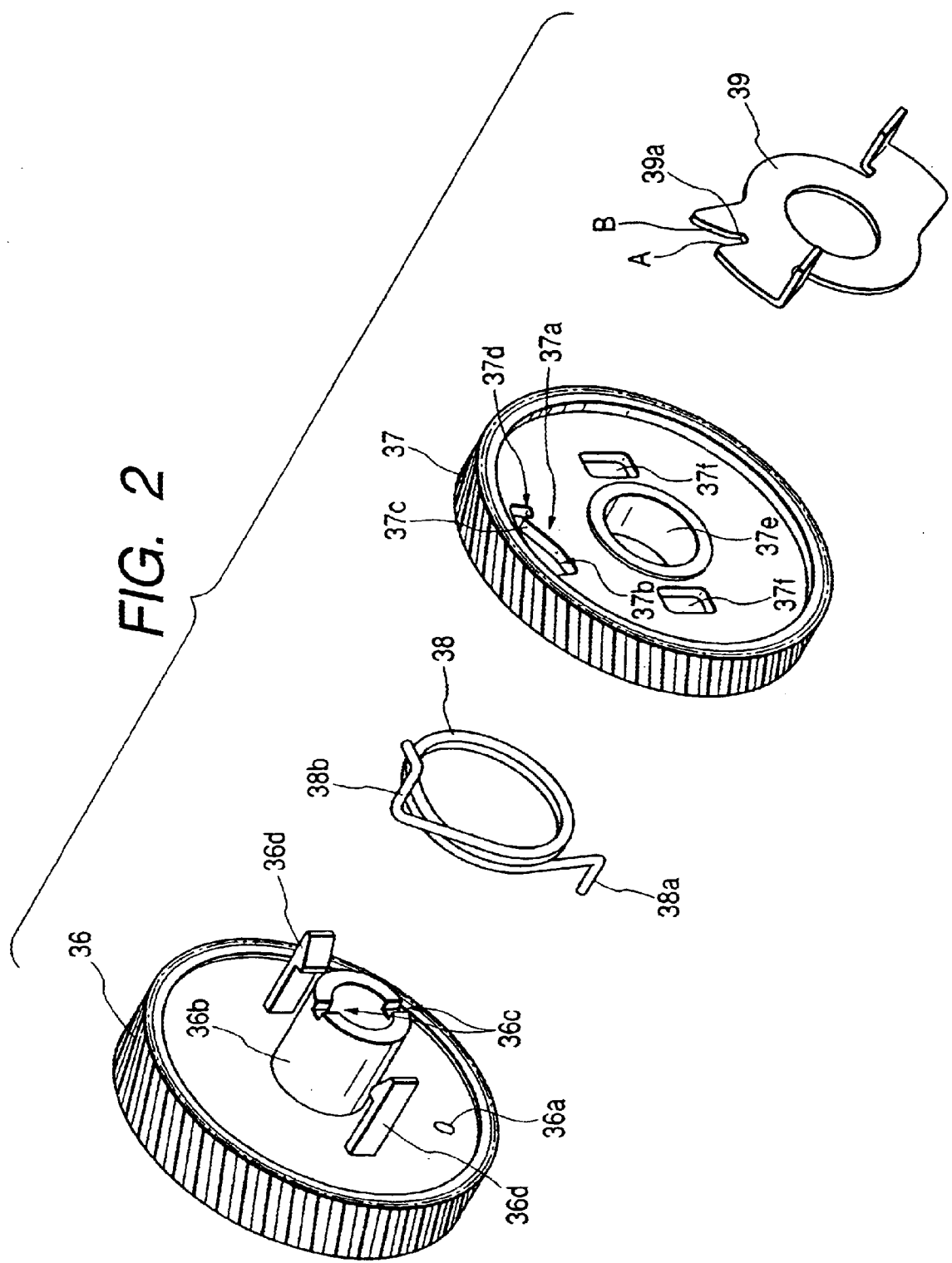
FIG. 2 is an exploded perspective view of a scissors gear.
Figure 3:
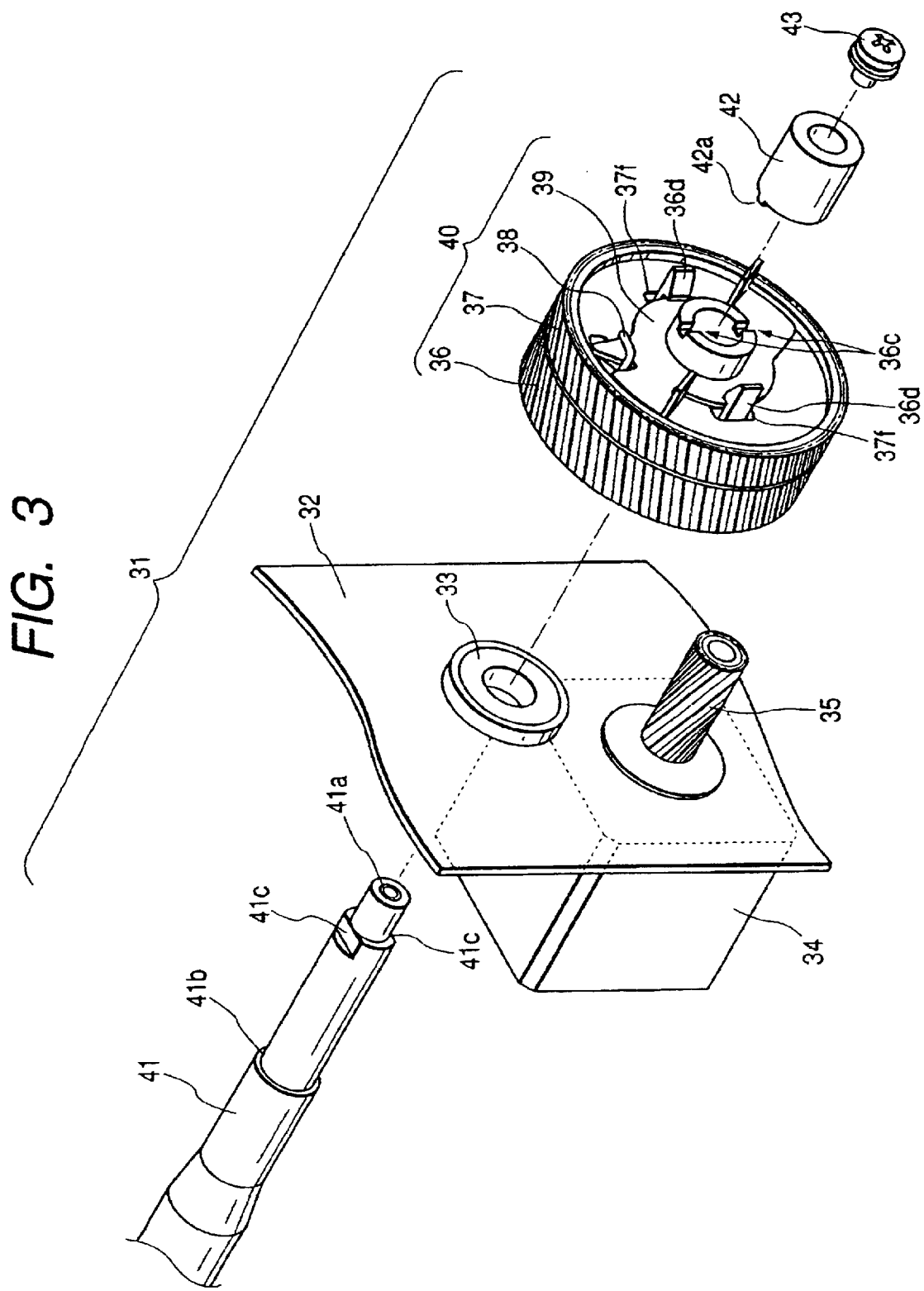
FIG. 3 is an exploded perspective view of a drum driving unit (a perspective view of the unit state of the scissors gear).
Figure 4:
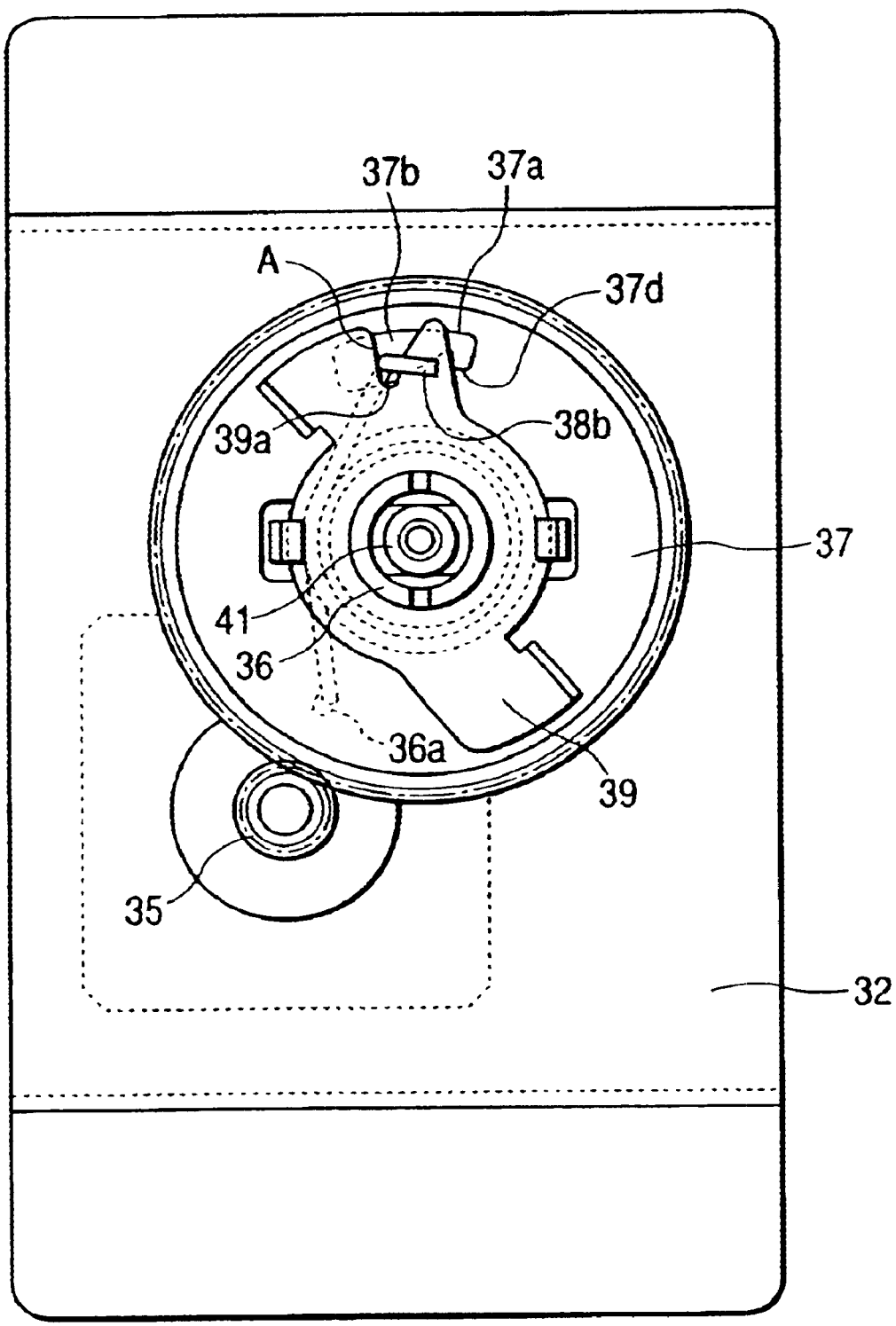
FIG. 4 is a front view as viewed from the rear of an apparatus showing the state before biasing pressure is imparted.

The scissors gear will now be described in detail. The scissors gear of the present invention adopts a unit construction so that the assembly thereof to the main body of the apparatus may become easy. FIGS. 2 and 3 are an exploded perspective view and a perspective view in the unit state, respectively, of the scissors gear. FIG. 4 is a front view as viewed from the rear of the apparatus.

A scissors gear unit 40 is comprised of four parts, i.e., the main gear 36, the sub-gear 37, the biasing spring 38 and a set lever 39, and the biasing spring 38 and the sub-gear 37 are assembled to the main gear 36 in the named order, and lastly the set lever 39 is brought into engagement with engagement pawls 36d having elasticity provided on the main gear 36, and these are made into a unit state. The reference character 37f denotes engagement pawl passing holes formed in the sub-gear 37.

The biasing spring 38 is a torsion coil spring and is disposed in the space between the main gear 36 and the sub-gear 37. One end 38a of the biasing spring 38 is engaged with the hole portion 36a of the main gear 36. The biasing spring 38 may be of any shape if it creates a biasing force to the gear, and here a coil spring is used and facilitates the attachment thereof to the gear. The sub-gear 37 has a hole portion 37a, and the other end 38b of the biasing spring 38 extends through the hole portion 37a of the sub-gear 37 and is located in the bias releasing portion 37b of the hole portion 37a. The groove portion 39a of the set lever 39 is engaged with the other end 38b of the biasing spring 38 with a lash. In this state, the positive biasing by the biasing spring 38 is not effected.

The sub-gear 37 is made rotatable relative to the main gear 36 with its inner diameter portion 37e fitted to the boss portion 36b of the main gear 36.

Description will now be made of a method of assembling the scissors gear unit 40 to the drum driving unit 31.

The motor 34 provided with the motor gear 35 is assembled to the frame 32 of the drum driving unit 31, and the drum shaft 41 is inserted into and tentatively assembled to a bearing 33 forced into and fixed to the frame 32. Subsequently, the scissors gear unit 40 is inserted from the rear of the drum shaft 41 and is fitted onto the drum shaft 41 to be assembled. At this time, the scissors gear unit is assembled while the biasing spring 38 does not remain in its pressurizing state and the phases of the main gear 36 and the sub-gear 37 remain arbitrary. The scissors gear unit 40 is set at a predetermined axial position and the meshing engagement between the motor gear 35 which is the opposed gear and the scissors gears 36, 37 is completed, whereafter the pressurizing work of the biasing spring is done.

Figure 5:
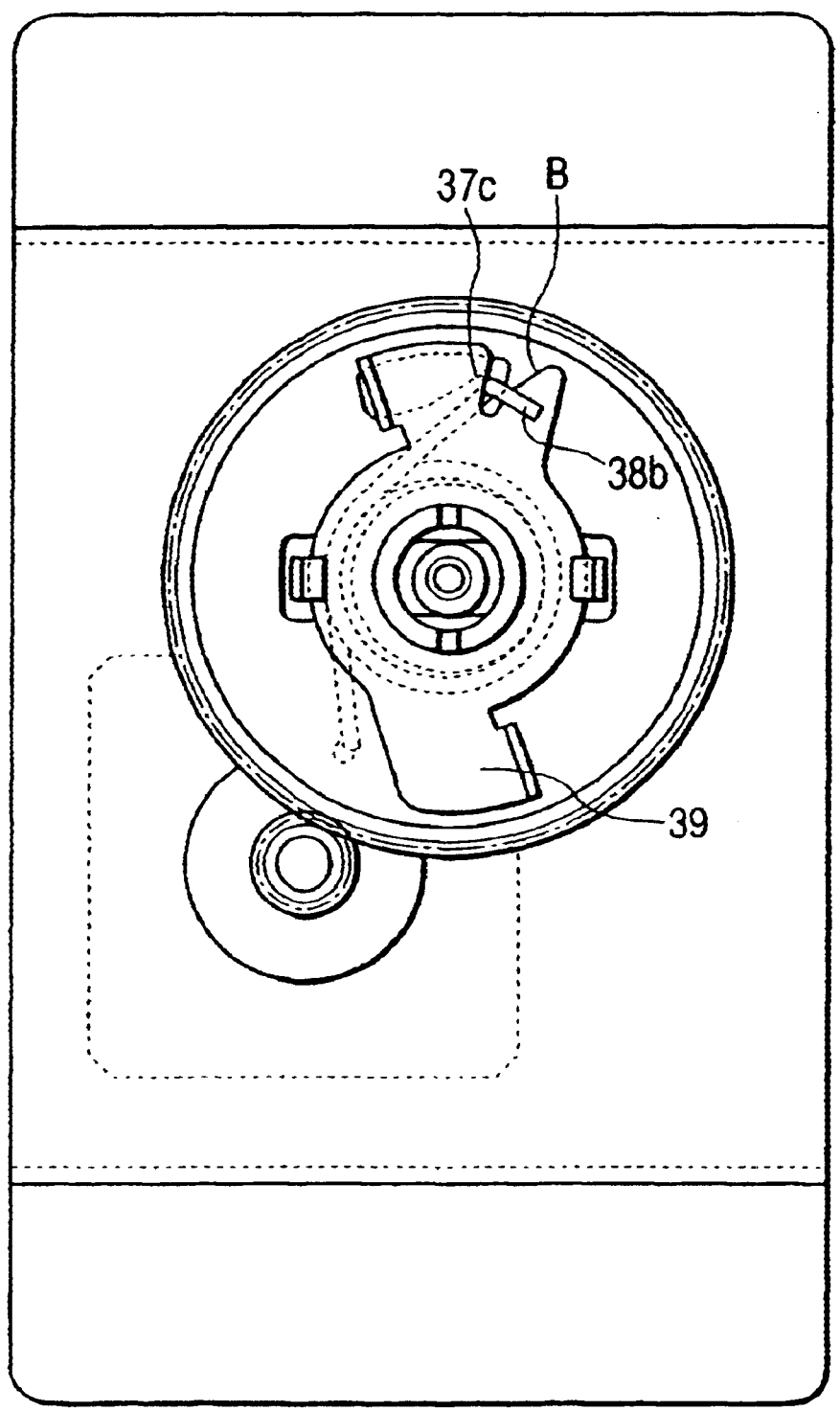
FIG. 5 is a front view as viewed from the rear of the apparatus showing the state after the biasing pressure has been imparted.

FIG. 4 shows the state before the application of the biasing pressure by the spring, and FIG. 5 shows the state after the application of such biasing pressure.

The charging work of the biasing pressure is done by clockwisely rotating the set lever 39 assisting in the engagement releasing operation of the biasing spring 38 through an angle of the order of 20 degrees with the main gear 36 held down so as not to be rotated by the rotation of the set lever 39.

By this operation, the other end 38b of the biasing spring is pushed to the side A of the set lever 39 and is moved in the hole portion 37a of the sub-gear 37. The other end 38b goes over a projected portion 37c by the bias releasing portion 37b and comes to an engagement portion 37d. The other end 38b of the biasing spring 38 comes into engagement with the sub-gear engagement portion 37d, whereby the biasing spring 38 generates a moment and the nipping operation by the scissors gears 36 and 37 is performed.

At this point of time, the scissors gear unit 40 is only mounted on the drum shaft 41 and is fixed neither circumferentially nor axially.

Description will now be made of the fixing of the scissors gear unit 40 to the drum shaft 41. The scissors gear unit 40 is assembled to the drum shaft 41, whereafter further a collar 42 is assembled onto the drum shaft 41. Thereafter, a screw 43 is mounted in a screw hole 41a formed in the end surface of the drum shaft and is fastened. Thereby, the main gear 36 of the scissors gears becomes sandwiched between the shoulder of a stepped portion 41b of the drum shaft 41 and the screw 43 together with the inner ring of the bearing 33 and the collar 42. In other words, the main gear 36 is axially brought into pressure contact with and fixed to the drum shaft 41.

This construction effects the transmission of the driving force from the main gear 36 to the drum shaft 41 through the above-described plurality of members, and utilizes the frictional driving of the end surface of the gear. Accordingly, it is necessary to firmly axially bring the main gear 36 into pressure contact so that the main gear 36 may not idly rotate relative to the drum shaft 41. As the screw 43, use is made of a screw with a spring and a washer to obviate the loosening of the screw with the dimensional change of the main gear 36 by creep and an unexpected overload taken into account.

Also, if the loosening of the screw should occur, in order to prevent the progress of the loosening of the screw and to prevent the idle rotation of the main gear 36 and the drum shaft 41, detents for preventing the rotation are provided between the drum shaft 41 and the collar 42 and between the collar 42 and the main gear 36, respectively. Between the drum shaft 41 and the color 42, the detent is provided by forming the fitting portion thereof into a double-chamfered shape 41c (FIG. 3). As shown in FIG. 3, convex portions 42a and concave portions 36c are provided as the detent between the collar 42 and the main gear 36. These convex and concave portions sufficiently have slops in the circumferential direction, and are not concerned in the usual drive transmission, but are given only the function as a detent.

The order of assembly may be to effect the charging work of the biasing spring 38, and thereafter effect the fixing of the scissors gear 36 to the drum shaft 41, as described above, or may be the converse thereof.

Also, when the dismounting of the scissors gear unit 40 is to be effected in case of the disassembly maintenance of the drum driving unit 31, the pressure charge releasing work of the biasing spring 38 is necessary. The pressure charge releasing work is done by rotating the set lever 39 in a reverse direction (counter-clockwise direction). By this operation, the other end 38b of the biasing spring 38, as shown in FIG. 5, is pushed to the side B of the set lever 39 and goes over the projected portion 37c and is disengaged from the engagement portion 37d of the sub-gear.

The epitome of the construction of the drum driving unit 31 has been described above. The essential portions of the construction will be described in greater detail and also, an effect obtained by this construction will be described.

First, as regards banding, the scissors gears are used, whereby there is obtained the effect of reducing the banding. This is considered to be because the spacing apart between the tooth flank or the tooth face of the main gear 36 and the tooth flank or the tooth face of the motor gear 35, which is the opposed gear, is suppressed by biasing.

When confirmation was experimentally made under the following conditions, the rotating speed change of the meshing frequency could be reduced to the order of ⅓ by using the scissors gears.

<Conditions>
Common to the gears: module 0.5, helix angle 20°;
Motor gear: 16 teeth, copper alloy;
Drum shaft gear: 96 teeth, polyacetal resin;
Number of revolutions of the drum shaft: 73 rpm; and
Biasing spring moment of the scissors gear: 18N·cm.

<Result>
Without scissors gears: w/f (wow and flutter) the order of 0.50% 0-p; and
With scissors gears: w/f (wow and flutter) the order of 0.15% 0-p.

The scissors gears are effective to reduce banding as described in connection with the conventional art, but require to effect pressure charge, and had a difficulty in the assembling property.

The scissors gears of the present invention, as described above, have realized a reasonable assembling property, whereby the object of providing an image forming apparatus effective to reduce banding and excellent in quality of image is achieved. In the present embodiment, the scissors gears of the present invention are used for the driving of the photosensitive drum 11 and therefore, the unevenness of rotation of the photosensitive drum 11 caused by the uneven meshing engagement of the drive gear of the photosensitive drum 11 can be reduced.

Description will now be made of the banding reducing effect of the scissors gears in an apparatus of a specification, which slows down the image forming process speed in conformity with the kind of the transfer material such as thick paper or OHT.

The following shows the results obtained by changing the number of revolutions of the drum shaft for the above-described conditions, and experimentally confirming the rotating speed fluctuation of the meshing frequency.

<Result at ½ Speed (the Rotating Speed of the Drum Shaft: 36.5 rpm)>
Without scissors gears: w/f (wow and flutter) the order of 0.32% 0-p; and
With scissors gears: w/f (wow and flutter) the order of 0.08% 0-p.

<Result at ¼ Speed (the Rotating Speed of the Drum Shaft: 18.25 rpm)>
Without scissors gears: w/f (wow and flutter) the order of 0.25% 0-p; and
With scissors gears: w/f (wow and flutter) the order of 0.10% 0-p.

The process using the imparting of inertia (the mounting of the flywheel), which is the conventional art, can obtain an effect at ¹⁄₁ speed (standard speed), but cannot obtain any effect at ½ speed and at ¼ speed, or the effect may be aggravated. In contrast, the scissors gears can obtain the effect of reducing the rotating speed fluctuation of the meshing frequency at all of ¹⁄₁ speed (standard speed), ½ speed and ¼ speed.

It is apparent from this that the scissors gears have the excellent effect that the banding reducing effect can be obtained irrespective of the image forming process speed (the rotating speed of the drum shaft). Accordingly, the scissors gears are best suited for an image forming apparatus having a plurality of image forming speeds.

Description will now be made of an embodiment in which the scissors gears are applied to other driving portion than that for the photosensitive drum. As members for contacting with the photosensitive drum to thereby effect image formation, there are image forming process means such as a transfer belt 4 (FIG. 6), an intermediate transfer member 16 (FIG. 7), a contact charging roller 14 (FIG. 7) for contacting with the photosensitive drum 11 to thereby uniformly charge the surface of the photosensitive drum, and a contact developing roller 13 (FIG. 7) for contacting with the photosensitive drum to thereby develop a latent image formed on the drum.

If there is a speed fluctuation (unevenness of rotation) in these image forming process means, the speed fluctuation (unevenness of rotation) is transmitted to the photosensitive drum through a portion of contact with the photosensitive drum to thereby induce a speed fluctuation (unevenness of rotation) of the photosensitive drum.

When these image forming process means are provided with a driving portion, the unevenness of rotation of a driving member typified by the unevenness of meshing engagement of a drive gear causes a speed fluctuation of the photosensitive drum, and the unevenness of a latent image of the period thereof is caused on the exposed portion of the photosensitive drum. When the amplitude of this unevenness of rotation of the driving portion is great, the speed fluctuation of the photosensitive drum and the unevenness of the latent image on the photosensitive drum become great, and this leads to the generation of banding.

As a method of suppressing the speed fluctuation of the photosensitive drum attributable to the unevenness of rotation of the driving portion of the image forming process means, there are the following two tacks:

(1) A countermeasure is taken for the driving portion of the image forming process means to thereby reduce the amplitude of the unevenness of rotation of the driving portion (a countermeasure for the generation source).

(2) The condition of contact between the image forming process means and the photosensitive drum is changed to thereby reduce the amount by which the unevenness of rotation of the driving portion is transmitted to the photosensitive drum (a countermeasure for the transmitting portion). Generally, the method of the above item (2) is accompanied by the changing of the image forming conditions and is therefore difficult. The method of the above item (1) is more desirable.

While in the above-described embodiment, the scissors gears are used for the driving of the photosensitive drum 11, this is not restrictive, but it will be apparent that if the scissors gears are used for the driving of image forming process means such as the transfer belt 4, the intermediate transfer member 16, the contact charging means 14 and the contact driving means 13, the unevenness of rotation of themselves can be reduced.

By the scissors gears being used in the driving portion of these image forming process means contacting with the photosensitive drum, the amplitude of the unevenness of rotation of the driving portion can be reduced, and the occurrence of banding by the deterioration of the accuracy of the rotation of the photosensitive drum is obviated.

Next, for color misregister, the method of coupling the gear to the drum shaft is made free of eccentricity and inclination to thereby obtain a color misregister reducing effect.

As described above, the present invention is such that when the gear is to be fixed to the drum shaft, the gear and the shaft are fitted to each other and the two are axially brought into pressure contact with each other and are fixed thereby, and no spring pin or parallel pins are used and, therefore, no eccentricity of the gear is generated during assembly attributable to such misalignment in centering of these members, as has been described in connection with the example of the conventional art.

Also, the shape of the inner diameter portion of the gear fitted onto the drum shaft is not provided with a groove shape for being engaged with the spring pin or a concavo-convex shape for use as a detent, in an area L (see FIG. 1) opposed to the meshing width, but is a simple cylindrical shape. Generally, a resin molded article, if provided with a groove or a cut-away shape in the inner diameter portion thereof, will be aggravated in the circularity of that portion. Therefore, slop (play) in its fitting to the outer diameter of the drum shaft will become great in a circumferential portion thereof and, as a result, this will cause the gear to be inclined when mounted with respect to the drum shaft.

In the construction of the present embodiment, as described above, the inner diameter of the gear is of a simple cylindrical shape and, therefore, the circularity of the inner diameter of the gear can be made highly accurate. As a result, the slop of its fitting to the outer diameter of the drum shaft can be made small in the overall circumferential area thereof, and the gear can be prevented from being inclined when mounted with respect to the drum shaft.

The present invention, as described above, is such that the gear and the shaft are brought into pressure contact with each other and fixed thereby and, therefore, it is necessary to prepare for the unexpected loosening of the screw. Therefore, a detent portion 36c is provided on the gear. The detent portion 36c is of a concave or convex shape and, therefore, a portion near it deteriorates the circularity of the inner diameter of the gear. If the position of this detent portion 36c is in the area L opposed to the meshing width, an eccentricity or inclination of the gear with respect to the drum shaft will result. Accordingly, there arises the necessity of paying consideration to the disposition of the detent portion 36c. The present invention places the detent portion 36c outside the opposed area L, to thereby obviate the occurrence of such an inconvenience as eccentricity or inclination of the gear with respect to the drum shaft, and the best state is obtained as the accuracy of assembly of the gear to the drum shaft.

As described above, in the present construction, when the gear is to be coupled to the drum shaft, the eccentricity or inclination of the gear with respect to the drum shaft is minimized. The deflection accuracy of the gear in its coupled state to the drum shaft is improved and, as a result, a reduction in the amount of expansion and contraction and the amount of color misregister of an image of each color is achieved and a high quality of image is achieved. This can be applied not only to the mounting of the gear to the shaft of the image bearing member, but also to the mounting of the gear to the transfer transporting means, the charging means or the developing means.

In an experimental comparison with an example of the conventional art, as shown in the following results, an improved effect in the order of ⅓ was obtained as compared with the example of the conventional art. The numerical results will be shown below.

<Amount of Expansion and Contraction of the Image of Each Other>

Example of the conventional art: in the order of 90 $\mu$m; and

Preferred Embodiment: in the order of 30 $\mu$m.

<Amount of Color Misregister>

Example of the conventional art: in the order of 180 $\mu$m at maximum; and

Preferred Embodiment: in the order of 60 $\mu$m at maximum.

What is claimed is:

1. A driving apparatus for driving image forming means used in an image forming apparatus, comprising:

a drive source for generating a driving force;

a drive transmitting gear for transmitting the driving force;

a first gear and a second gear meshing with said drive transmitting gear; and biasing means engaged with said first gear and said second gear for circumferentially biasing said first gear and said second gear, wherein one end portion of said biasing means is engaged with said first gear, and an other end portion of said biasing means is moved between an engagement portion and an engagement releasing portion provided in said second gear, so that said biasing means is changed over between a biasing state and a bias releasing state, and wherein said second gear is provided with a projected portion for preventing said other end portion of said biasing means from moving from said engagement portion to said engagement releasing portion when said biasing means is in the biasing state.

2. A driving apparatus according to claim 1, further comprising a movement assisting member for moving said other end portion of said biasing means between said engagement portion and said engagement releasing portion.

3. A driving apparatus according to claim 1, wherein a gear unit having said first gear, said second gear and said biasing means is detachably attachable to a rotatable shaft.

4. A driving apparatus according to claim 2, wherein a gear unit having said first gear, said second gear, said biasing means and said movement assisting member is detachably attachable to a rotatable shaft.

5. A driving apparatus according to claim 1, wherein said drive source is operable at a plurality of speeds.

6. A driving apparatus according to claim 1, further comprising fixing means for fixing said first gear to a rotatable shaft by pressing said first gear axially against said rotatable shaft.

7. A driving apparatus according to claim 6, wherein said first gear has a gear rotating engagement portion engaged with said fixing means in a gear rotating direction.

8. A driving apparatus according to claim 6, wherein rotatable said shaft has a shaft rotating engagement portion engaged with said fixing means in a shaft rotating direction.

9. A driving apparatus according to claim 6, wherein said fixing means has an abutting member abutting against said first gear, and a screw member connected to said rotatable shaft and axially pressing said abutting member.

10. A driving apparatus according to claim 2, wherein said movement assisting member is rotatable about a drive shaft for transmitting the driving force to said image forming means.

11. An image forming apparatus comprising:

image forming means for forming an image;

a drive source for generating a driving force for driving said image forming means;

a drive transmitting gear for transmitting the driving force;

a first gear and a second gear meshing with said drive transmitting gear; and biasing means engaged with said first gear and said second gear for circumferentially biasing said first gear and said second gear, wherein one end portion of said biasing means is engaged with said first gear, and an other end portion of said biasing means is moved between an engagement portion and an engagement releasing portion provided in said second gear, so that said biasing means is changed over between a biasing state and a bias releasing state, and wherein said second gear is provided with a projected portion for preventing said other end portion of said biasing means from moving from said engagement portion to said engagement releasing portion when said biasing means is in the biasing state.

12. An image forming apparatus according to claim 11, further comprising a movement assisting member for moving said other end portion of said biasing means between said engagement portion and said engagement releasing portion.

13. An image forming apparatus according to claim 11, wherein a gear unit having said first gear, said second gear and said biasing means is detachably attachable to a rotatable shaft.

14. An image forming apparatus according to claim 12, wherein a gear unit having said first gear, said second gear, said biasing means and said movement assisting member is detachably attachable to a rotatable shaft.

15. An image forming apparatus according to claim 11, wherein said drive source is operable at a plurality of speeds.

16. An image forming apparatus according to claim 11, further comprising fixing means for fixing said first gear to a rotatable shaft by pressing said first gear axially against said rotatable shaft.

17. An image forming apparatus according to claim 16, wherein said first gear has a gear rotating engagement portion engaged with said fixing means in a gear rotating direction.

18. An image forming apparatus according to claim 16, wherein said rotatable shaft has a shaft rotating engagement portion engaged with said fixing means in a shaft rotating direction.

19. An image forming apparatus according to claim 16, wherein said fixing means has an abutting member abutting against said first gear, and a screw member connected to said rotatable shaft and axially pressing said abutting member.

20. An image forming apparatus according to claim 11, wherein said image forming means has an image bearing member for bearing the image thereon, and the driving force is transmitted to said image bearing member.

21. An image forming apparatus according to claim 11, wherein said image forming means has an image bearing member for bearing the image thereon, and process means contacting said image bearing member, and wherein the driving force is transmitted to said process means.

22. An image forming apparatus according to claim 21, wherein said process means is charging means for charging said image bearing member.

23. An image forming apparatus according to claim 21, wherein said process means is an intermediate transfer member, to which the image formed on said image bearing member is transferred.

24. An image forming apparatus according to claim 21, wherein said process means is transfer material transporting means for transporting a transfer material, to which the image formed on said image bearing member is transferred.

25. An image forming apparatus according to claim 21, wherein said process means is developing means for developing a latent image on said image bearing member.

26. An image forming apparatus according to claim 12, wherein said movement assisting member is rotatable about a drive shaft for transmitting the driving force to said image forming means.

* * * * *

UNITED STATES PATENT AND TRADEMARK OFFICE
CERTIFICATE OF CORRECTION

PATENT NO. : 6,661,986 B2
DATED : December 9, 2003
INVENTOR(S) : Kunihiko Kitayama It is certified that error appears in the above-identified patent and that said Letters Patent is hereby corrected as shown below:

<u>Column 6,</u>
Line 3, "it" should read -- a --.

<u>Column 9,</u>
Line 47, "had a difficult" should read -- have a difficulty --.

<u>Column 12,</u>
Line 44, "an other" should read -- another --.

<u>Column 13,</u>
Line 9, "rotatable said" should read -- said rotatable --.

Signed and Sealed this

First Day of June, 2004

JON W. DUDAS
*Acting Director of the United States Patent and Trademark Office*